(12) United States Patent
Kobayashi et al.

(10) Patent No.: US 11,250,361 B2
(45) Date of Patent: Feb. 15, 2022

(54) EFFICIENT MANAGEMENT METHOD OF STORAGE AREA IN HYBRID CLOUD

(71) Applicant: Hitachi, Ltd., Tokyo (JP)

(72) Inventors: Miho Kobayashi, San Jose, CA (US); Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/881,583

(22) Filed: May 22, 2020

(65) Prior Publication Data

US 2021/0365857 A1    Nov. 25, 2021

(51) Int. Cl.
*G06Q 10/06* (2012.01)

(52) U.S. Cl.
CPC .............................. *G06Q 10/06313* (2013.01)

(58) Field of Classification Search
CPC ..................................................... G06Q 10/06
See application file for complete search history.

(56) References Cited

U.S. PATENT DOCUMENTS

| 9,424,545 B1* | 8/2016 | Lee ................. G06Q 10/063114 |
| 9,479,451 B1* | 10/2016 | Wertheimer .......... H04L 47/748 |
| 2014/0229610 A1* | 8/2014 | Shen ...................... G06F 9/505 709/224 |
| 2014/0257910 A1* | 9/2014 | Anders ............ G06Q 10/06313 705/7.23 |
| 2015/0324381 A1 | 11/2015 | Brand |
| 2016/0019484 A1* | 1/2016 | Srivastava ..... G06Q 10/063118 705/7.17 |
| 2019/0325089 A1* | 10/2019 | Golparvar-Fard .......................... G06F 3/04815 |

\* cited by examiner

*Primary Examiner* — Kurtis Gills
(74) *Attorney, Agent, or Firm* — Procopio, Cory, Hargreaves & Savitch LLP

(57) ABSTRACT

Example implementations described herein involve providing an interface configured to receive input to generate a project request for a project; determining an allocation of resources for the project for execution; determining a schedule for the project based on the project request based on the allocation of resources; for the first service platform being available to allocate the resources to execute the project according to the schedule, allocating the resources for executing the project on the first service platform according to the schedule; for the first service platform being unavailable to execute the project according to the schedule, determining whether a second service platform is available to allocate the resources to execute the project according to the schedule, and for the second service platform being available to execute the project according to the schedule, allocating the resources for executing the project on the second service platform according to the schedule.

15 Claims, 13 Drawing Sheets

FIG. 5

Project request table

| Project | Start data /time | Term | Priority | Project size | Device size | Using Public Cloud | Public Cloud Vendors |
|---|---|---|---|---|---|---|---|
| A | 02.12.2020, 3:00pm | 5 days | Low | Medium | 15GBytes x 20 | OK | Company B |
| B | 02.15.2020, 12:00am | 10 days | High | Large | 100GBytes x 100 50GBytes x 2 | NG | - |
| C | 02.14.2020, 12:00pm | 3 days | Medium | Small | 10GBytes x 3 | OK | Company A, Company C |
| ... | | | | | | | |

Project management table

| Project | Start data /time | Term | Priority | Project size | Using Public Cloud | Device size | Public Cloud ||| 
| | | | | | | | Vendor | Start data/time | Required Resources |
|---|---|---|---|---|---|---|---|---|---|
| A | 02.13.2020, 11:00pm | 5 days | Low | Medium | OK | 15GBytes x 20 | - | - | - |
| B | 02.15.2020, 15:00pm | 10 days | High | Large | NG | 100GBytes x 100 50GBytes x 2 | - | - | - |
| C | 02.14.2020, 11:00pm | 3 days | Medium | Small | OK | 10GBytes x 3 | Company A | 02.15.2020, 11:00pm | 20GB device Low spec VM |
| ... | | | | | | | | | |

FIG. 6

New Project Request Form

| | |
|---|---|
| Project name: | A |
| Start date/time: | 02/12/2020    3:00 PM |
| Project term: | 5 days |
| Project priority: | ○ High    ○ Medium    ● Low |
| Project size: | ○ Large    ● Medium    ○ Small |
| Using Public Cloud Service if the resource of on-prem Is not enough: | ● Yes    ○ No |
| Which Public Cloud vendors do you'd like to use? (multiple choice answers): | ● Company B    ○ Company Z    ○ Company A |

Submit

FIG. 7

Start of a project management program

EFFICIENT MANAGEMENT METHOD OF STORAGE AREA IN HYBRID CLOUD

BACKGROUND

Field

The present disclosure is generally directed to hybrid cloud systems, and more specifically, to management of storage areas in hybrid cloud systems.

Related Art

The demand for Information Technology (IT) infrastructure flexibility is the use of public clouds. Some companies already have on-premise (hereinafter on-prem) implementations in their own data centers. Thus, one of the popular IT environments involves a mix of on-prem and public cloud, which is known as hybrid cloud. Central management can be needed to use hybrid cloud efficiently, since it can be difficult for users to handle many systems (e.g., on-prem, public cloud) separately.

One of the positives of using public clouds is that they are implemented as a pay-as-you-go payment system, which is that the users only pay the cost for actual use of the public clouds. Such systems can be good for users who use the system for a short time, however it is difficult to predict the cost, which can cause problems such as poor cost management.

On the other hand, one of the positives of using on-prem is that it can be easier to predict the budget, and the cost can be cheaper if the system is utilized for long periods of time. However, there is a possibility that unnecessary system resource purchases may occur since on-prem are pre-purchased.

SUMMARY

To solve this resource planning problems in hybrid cloud, the example implementations described herein involve systems and methods in which users first use the already purchased on-prem resources, and also use public clouds as additional resources if there is an on-prem resource shortage. Most companies can have several business projects which need to use an IT environment, therefore the example implementations described herein involve a management tool with which project management is facilitated. The management tool controls/calculates the system resource utilization based on the on-prem information/project requests and assigns the proper resources from on-prem and/or public cloud to each project.

Example implementations described herein can therefore involve systems and methods in which public cloud resources are assigned to a user if there is an on-prem resource shortage, and facilitates efficient resource management for many projects within a company.

Aspects of the present disclosure involve a method, which can involve providing an interface configured to receive input to generate a project request for a project; determining an allocation of resources for the project for execution; determining a schedule for the project based on the project request based on the allocation of resources; for the first service platform being available to allocate the resources to execute the project according to the schedule, allocating the resources for executing the project on the first service platform according to the schedule. For the first service platform being unavailable to execute the project according to the schedule, determining whether a second service platform is available to allocate the resources to execute the project according to the schedule, for the second service platform being available to execute the project according to the schedule, allocating the resources for executing the project on the first service platform according to the schedule; and for the second service platform being unavailable to execute the project according to the schedule, rejecting the project request.

Aspects of the present disclosure involve a non-transitory computer readable medium, storing instructions for executing a process, the instructions involving providing an interface configured to receive input to generate a project request for a project; determining an allocation of resources for the project for execution; determining a schedule for the project based on the project request based on the allocation of resources; for the first service platform being available to allocate the resources to execute the project according to the schedule, allocating the resources for executing the project on the first service platform according to the schedule. For the first service platform being unavailable to execute the project according to the schedule, determining whether a second service platform is available to allocate the resources to execute the project according to the schedule, for the second service platform being available to execute the project according to the schedule, allocating the resources for executing the project on the second service platform according to the schedule; and for the second service platform being unavailable to execute the project according to the schedule, rejecting the project request.

Aspects of the present disclosure involve a system, which can involve means for providing an interface configured to receive input to generate a project request for a project; means for determining an allocation of resources for the project for execution; means for determining a schedule for the project based on the project request based on the allocation of resources; for the first service platform being available to allocate the resources to execute the project according to the schedule, means for allocating the resources for executing the project on the first service platform according to the schedule. For the first service platform being unavailable to execute the project according to the schedule, means for determining whether a second service platform is available to allocate the resources to execute the project according to the schedule, for the second service platform being available to execute the project according to the schedule, means for allocating the resources for executing the project on the first service platform according to the schedule; and for the second service platform being unavailable to execute the project according to the schedule, rejecting the project request.

Aspects of the present disclosure involve an apparatus, which can include a processor, configured to provide an interface configured to receive input to generate a project request for a project; determine an allocation of resources for the project for execution; determine a schedule for the project based on the project request based on the allocation of resources; for the first service platform being available to allocate the resources to execute the project according to the schedule, allocate the resources for executing the project on the first service platform according to the schedule. For the first service platform being unavailable to execute the project according to the schedule, determine whether a second service platform is available to allocate the resources to execute the project according to the schedule, for the second service platform being available to execute the project according to the schedule, allocate the resources for executing the project on the second service platform according to the schedule; and for the second service platform being unavailable to execute the project according to the schedule, reject the project request.

BRIEF DESCRIPTION OF DRAWINGS

FIG. 5 illustrates an example of the project request table in the project management service, in accordance with an example implementation.

FIG. 6 illustrates the project request table, in accordance with an example implementation.

FIG. 7 illustrates an example of the user request form, in accordance with an example implementation.

DETAILED DESCRIPTION

Figure 1:
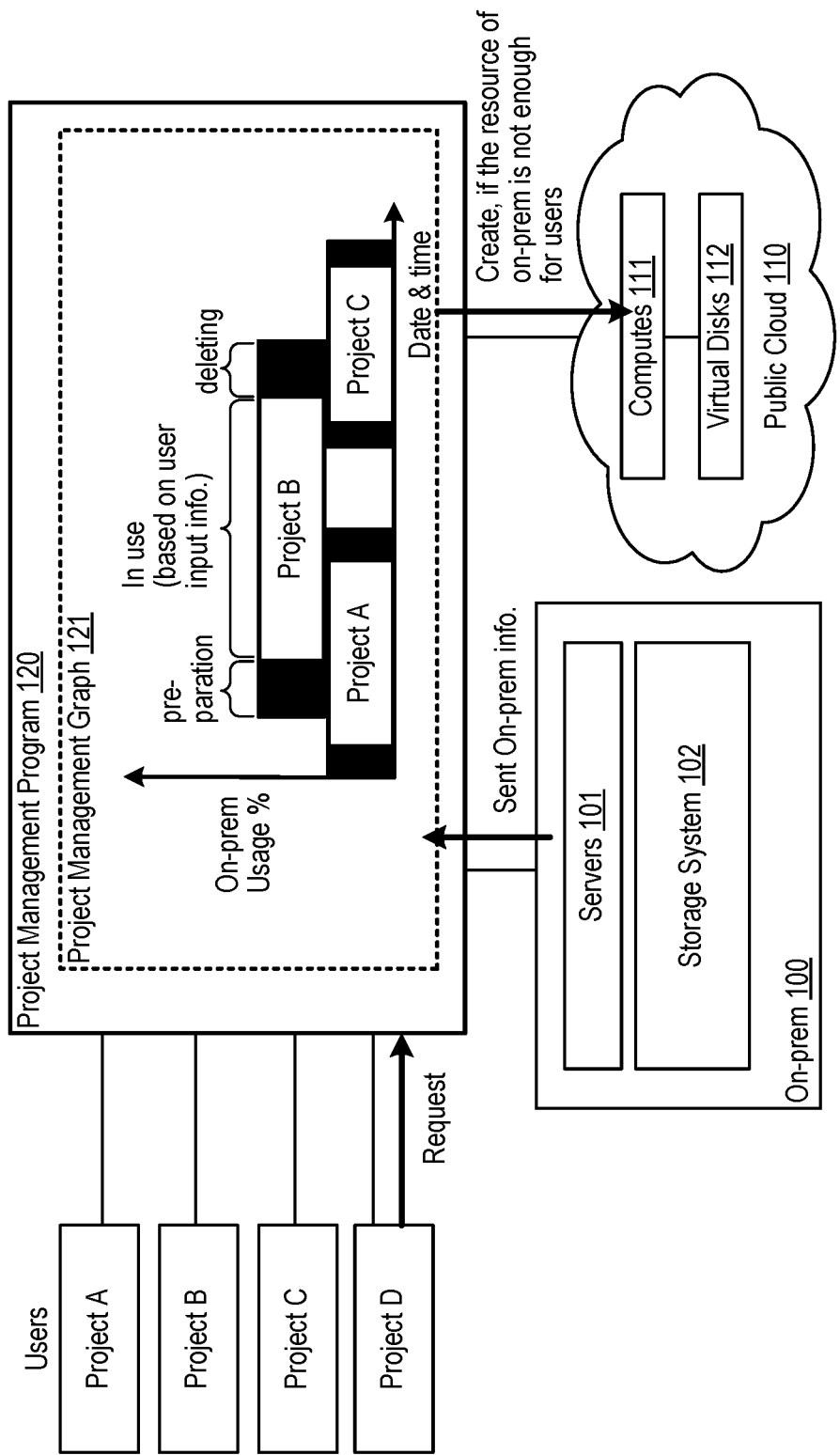
FIG. 1 illustrates an example system outline, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a project management service which creates project management information, a project management program that assigns the resources when a project sends a new project request, and a project management program that assigns a public cloud resource if there are insufficient assignable on-prem resources.

FIG. 1 illustrates an example system outline, in accordance with an example implementation. As illustrated in FIG. 1, there is an IT environment involving on-prem 100 and public cloud 110 connected with each other via a network. Further, the project management program 120 relates users (projects), on-prem 100, and public cloud 110 to control the whole system. On-prem 100 includes resources such as servers 101 and storage systems 102. Public cloud 110 includes resources such as computes 111 and virtual disks 112.

When a project request for creating the new project is provided to a project management service, the project management program 120 confirm the project management information (info), which can include a project management graph 121, and calculates and judges whether resources can be assigned to the project or not. To do this, the project management program 120 receives the on-prem info in advance since the info is utilized to predict on-prem usage and to calculate preparation and deletion time of on-prem resources for a project. The deletion and preparation time can be calculated through any desired implementation known in the art, such as through functions as provided by the particular storage system(s) for managing the storage system(s). Similarly, the total time of project execution can also be calculated through any desired implementation known in the art, such as through functions as provided by the particular storage system(s).

When the project management program 120 determines that the resources will be insufficient if the new project request is accepted, the program will determine to use public cloud resources (e.g., computes 111, virtual disks 112, etc.) for additional capacity if the project permits the use of the public cloud 110. The project management program creates public cloud resources with the account, project already inputted in advance, and the timing of creating resource is decided based on the project management info to avoid extra public cloud costs.

As illustrated in FIG. 1, the project management graph 121 illustrates the execution duration of each of the projects, which includes the time required to prepare the resources, the time required to deallocate/delete such resources, and the execution time of the project.

Figure 2:
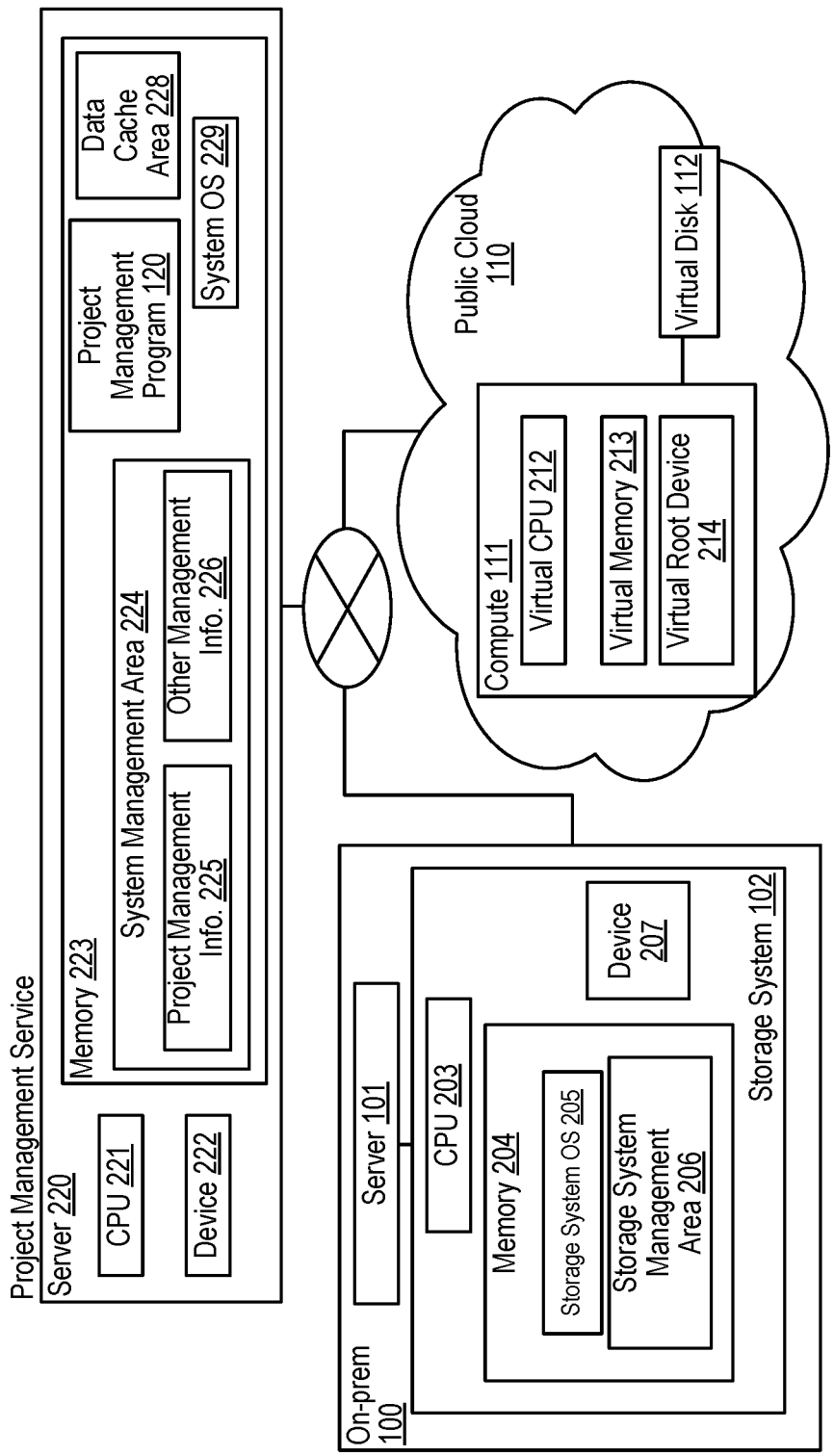
FIG. 2 illustrates an example logical configuration of the system in which the example implementations described herein may be applied.

FIG. 2 illustrates an example logical configuration of the system in which the example implementations described herein may be applied. Project management service may be established in a physical server 220, or a virtual machine, or as a container implemented as a Software as a Service (SaaS), depending on the desired implementation.

Project management service may involve a central processing unit (CPU) 221, Device 222, and Memory 223. Memory may involve system management area 224, project management program 120, data cache area 228, and system operating system (OS). System management area 224 can include project management info 225 and other management info 226. CPU 221 can be in the form of one or more hardware processors, or a combination of hardware and software processors depending on the desired implementation.

Storage system 102 can involve CPU 203, memory 204 and device 207. CPU 203 can be in the form of one or more hardware processors, or a combination of hardware and software processors depending on the desired implementation. Memory 204 can be configured to manage storage system OS 205 and storage system management area 206.

Compute 111 can include virtual CPU 212, virtual memory 213, and virtual root device 214 as facilitated by a plurality of servers and storage systems, in accordance with the desired implementation.

As will be described herein, CPU 221 is configured to load project management program 120 to execute the flows as illustrated in FIGS. 9 to 13. CPU 221 can be configured to provide an interface configured to receive input to generate a project request for a project as illustrated in FIG. 7; determine an allocation of resources for the project for execution as illustrated at 902-903 of FIG. 9; and determine a schedule for the project based on the project request based on the allocation of resources as illustrated at 902-903 of FIG. 9. For the first service platform being available to allocate the resources to execute the project according to the schedule, CPU 221 is configured to allocate the resources for executing the project on the first service platform according to the schedule as illustrated at 905 and 906 of FIG. 9. For the first service platform being unavailable to execute the project according to the schedule, CPU 221 can be configured to determine whether a second service platform is available to allocate the resources to execute the project according to the schedule as illustrated at 904 of FIG. 9. For the second service platform being available to execute the project according to the schedule, CPU 221 can be configured to allocate the resources for executing the project on the second service platform according to the schedule as illustrated at 905 and 906 of FIG. 9; and for the second service platform being unavailable to execute the project according to the schedule, CPU 221 is configured to reject the project request as illustrated at 907 of FIG. 9.

Figure 9:
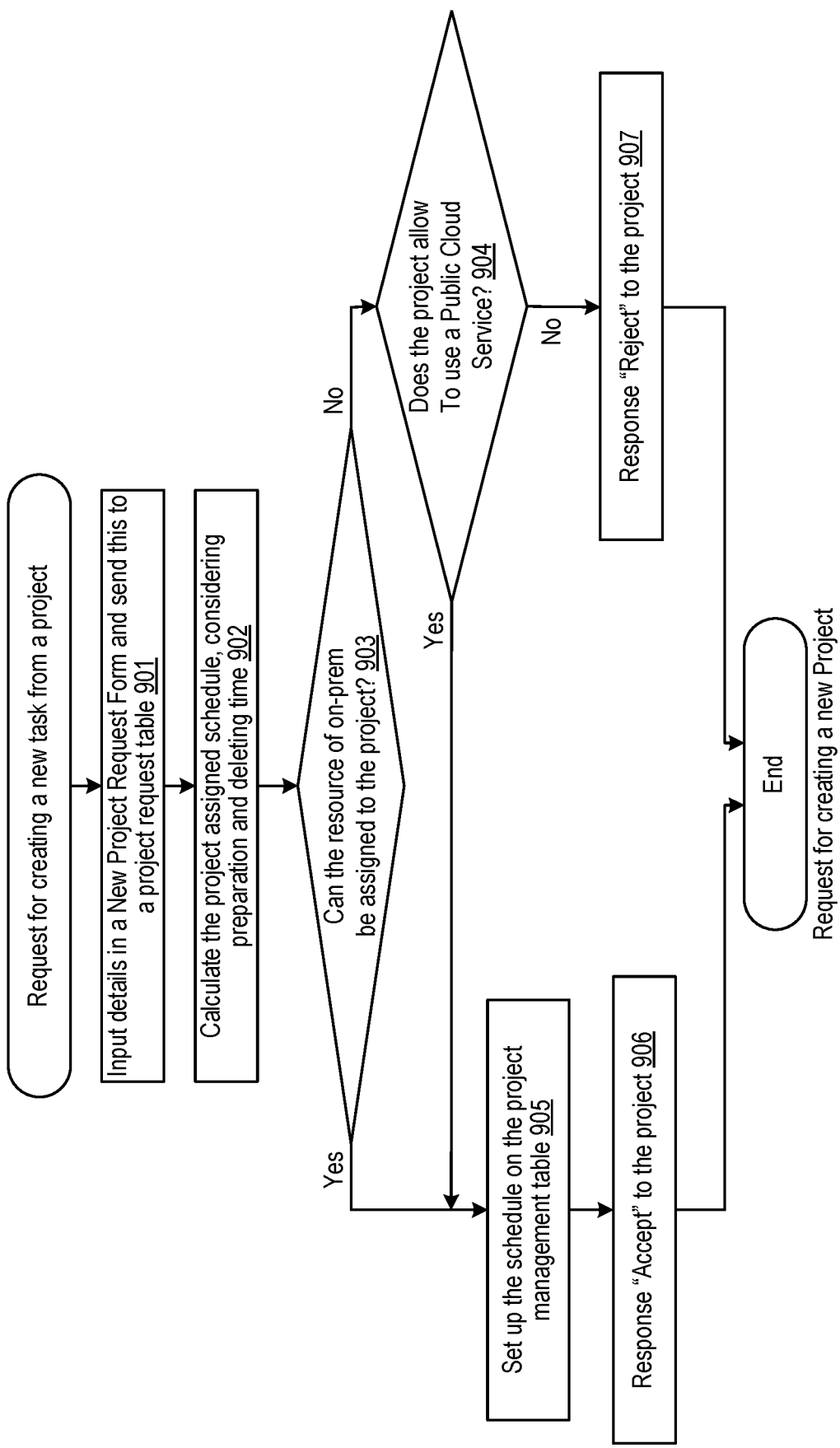
FIG. 9 illustrates an example flow for a request for creating a new project, in accordance with an example implementation.

CPU 221 is configured to determine the schedule for the project based on the project request by determining a preparation time for allocating the allocation of resources; determining a deletion time for deleting the allocation of resources; and determining a total time required for executing the project based on incorporation of the preparation time and the deletion time as described with respect to 902 of FIG. 9.

CPU 221 is configured to provide a management graph mapping projects executed by the first service platform based on resource usage and execution duration of each of the projects based on a start time and an end time, the execution duration including a preparation time and a deletion time as illustrated at 121 of FIG. 1.

As described herein, the first service platform can be one of an on-premise system or a colocation system, and the second service platform can be a public cloud system as illustrated in FIG. 2.

Figure 12:
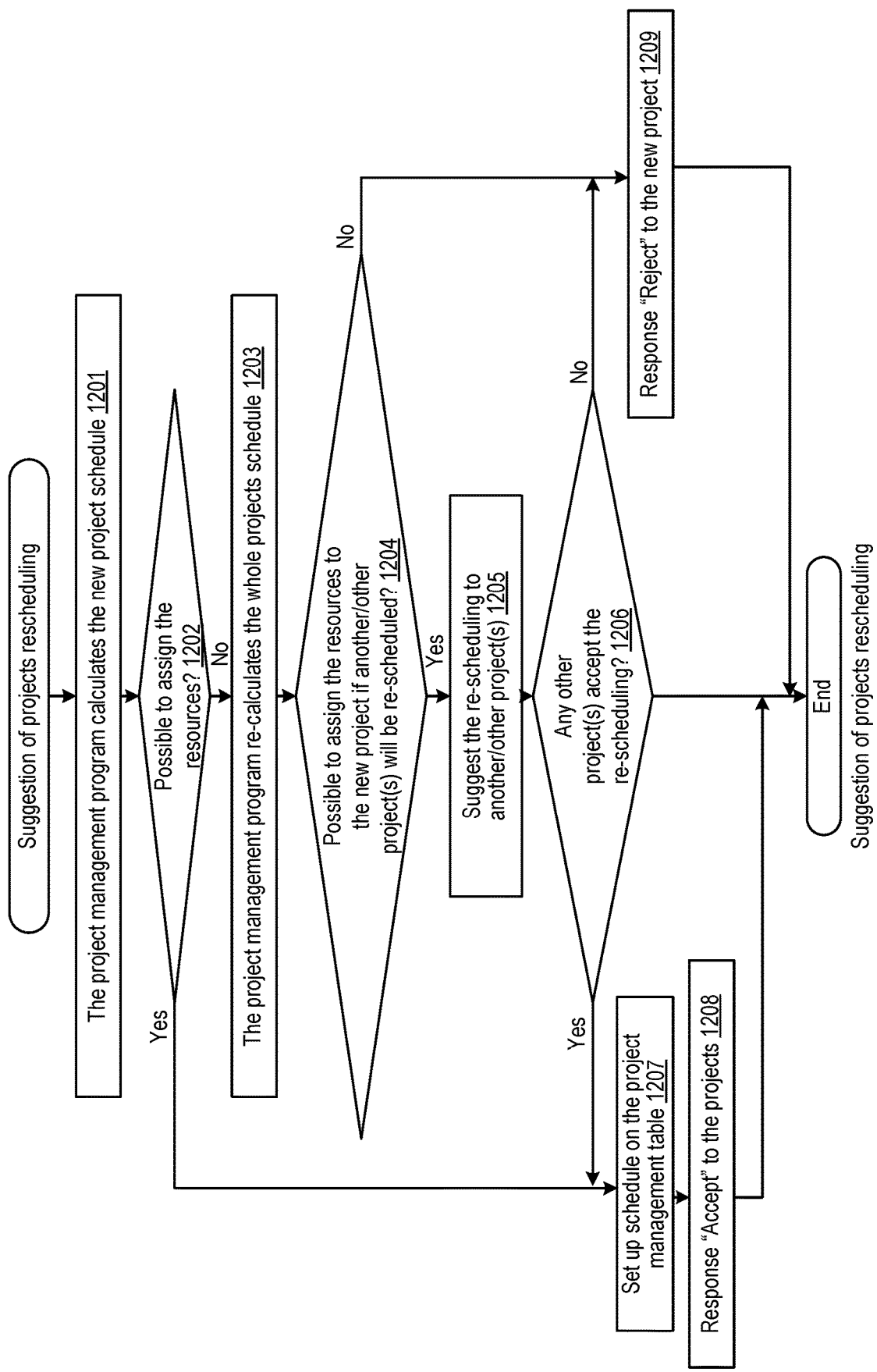
FIG. 12 illustrates another example flow for providing project rescheduling, in accordance with an example implementation.

CPU 221 can be configured to determine whether the first service platform is available to allocate the resources to execute the project according to the schedule, by, for a start time of the project request not being available for execution of the project, determining a rescheduling for one or more projects executing on the first service platform; providing the rescheduling to the one or more projects; for an acceptance of the rescheduling by the one or more projects, determining that the first service platform is available; and for a rejection of the rescheduling by the one or more projects, determining that the first service platform is unavailable as illustrated in FIG. 12.

As illustrated in FIG. 7, the interface is configured to receive input as to whether the second service platform is available for the project. In this manner, the user can specify as to whether the project is permitted to be executed on the public cloud.

Figure 3:
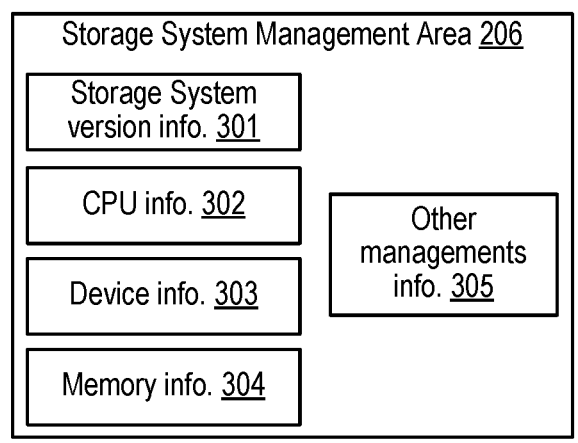
FIG. 3 illustrates an example of the storage system management area in on-prem, in accordance with an example implementation.

FIG. 3 illustrates an example of the storage system management area 206 in on-prem, in accordance with an example implementation. The storage system management area 206 can include Storage system version info 301, CPU info. 302, Device info 303, and Memory info 304 which is sent to the project management service for use in calculating the resource assignments. Device info 303 may include volume info and so on. Depending on the desired implementation, other management info 305 can include information to manage the storage system, such as network interfaces, license info and so on. Such information in the other management info 305 can be sent to the project management service depending on the project management requirements.

Figure 4:
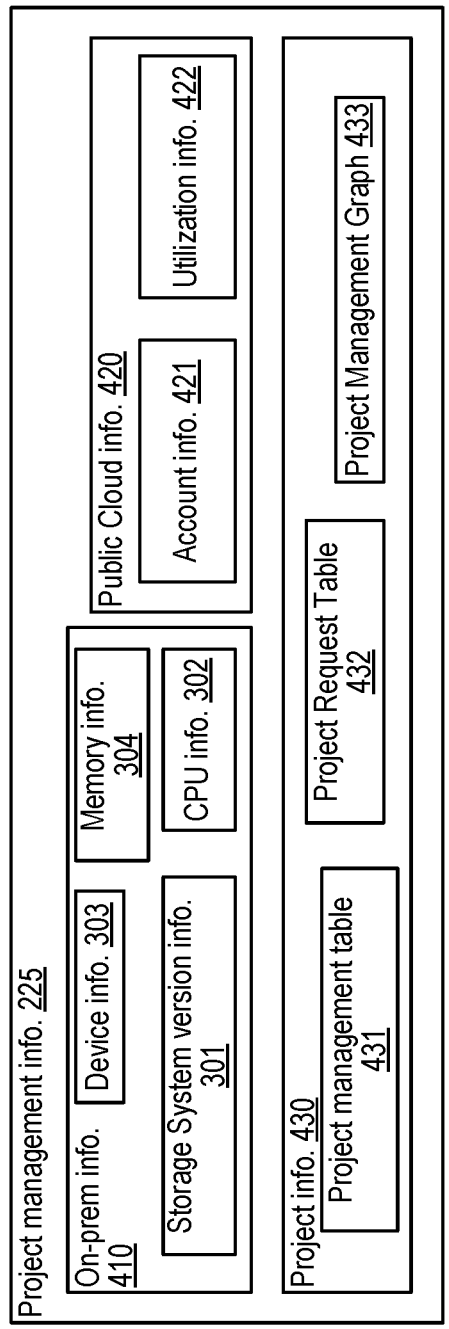
FIG. 4 illustrates an example of the project management info in the project management service, in accordance with an example implementation.

FIG. 4 illustrates an example of the project management info 225 in the project management service, in accordance with an example implementation. The On-prem info area stores the info 410 from on-prem 110 as described in FIG. 3.

Figure 8:
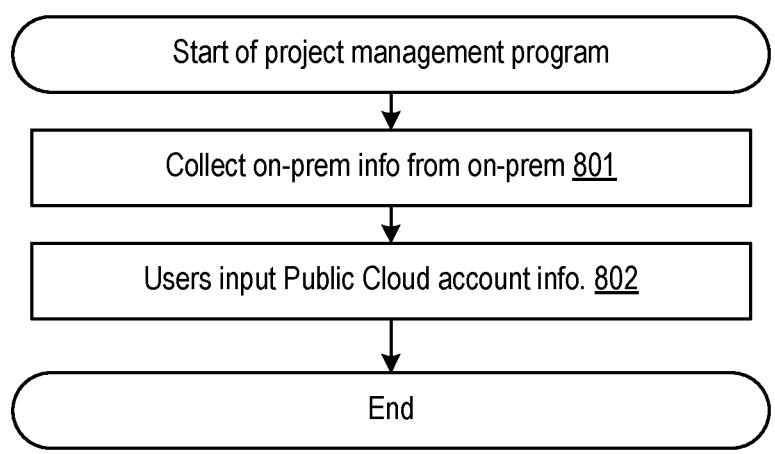
FIG. 8 illustrates an example process of starting a project management program, in accordance with an example implementation.

Public cloud info area 420 stores the public cloud account info 421 which is provided by users as illustrated in FIG. 8. The utilization info 422 includes the use cost of the public cloud and so on, depending on the desired implementation. The public cloud account info 421 may be inputted the project program service provider in advance. And instead of public cloud vendors, the provider may charge the all public cloud costs to the company or projects.

Project info area 430 stores management information such as a project management table 431, project request table 432, and project management graph 433. The project request table 432 stores the items sent by a project to create a new project. The project management table 431 manages which projects are allocated resources as illustrated in FIG. 6.

FIG. 5 illustrates an example of the project request table 432 in the project management service, in accordance with an example implementation. This manages the items each project sends, and the items are added when creating the new project is requested.

FIG. 6 illustrates the project request table, in accordance with an example implementation. The project management program calculates how to assign resources to a project, based on the info of the project request table 432 and the on-prem info 410. The results of the calculations are inputted in this table.

FIG. 7 illustrates an example of the user request form, in accordance with an example implementation. When a project request creates a new project, a project inputs the items via a new project request form. The interface may be applied on the dashboard of project management service portal, in accordance with an example implementation. From this interface, a project request can thereby be generated as illustrated in project request table of FIG. 5.

As illustrated in FIG. 7, the project start time and duration can be specified, as well as the priority for the project, the size of the project, permission to use public cloud resources for the project, and desired vendor, if any, for public cloud resources. Through such input, the project request can thereby specify whether the public cloud resources are available for use for the project as illustrated in FIG. 9. Further, the specified priority and size of the project can be utilized by management functions of the storage system(s) to determine flexibility in scheduling or estimated resource usage in accordance with the desired implementation, and through any implementation known in the art.

FIG. 8 illustrates an example process of starting a project management program 120, in accordance with an example implementation. Before the service is used, the project management program 120 collects the info from the on-prem 100 and public cloud 110 at 801. Users can also input public cloud account information in accordance with the desired implementation. Further, such info can be modified or added when the on-prem/public cloud info is updated or otherwise depending on the desired implementation.

FIG. 9 illustrates an example flow for a request for creating a new project, in accordance with an example implementation. At 901, a project sends the request of new project launching via the new project request form to the project request service, and the items are stored in the project request table 432.

At 902, the project management program 120 calculates the project assigned schedule, considering the resource preparation and deleting time based on the project management info. At 903, the project management program 120 judges whether the resource of on-prem 100 can be assigned to the new project or not. If the answer is No, then the flow proceeds to 904, otherwise (Yes), the flow proceeds to 905.

At 904, a determination is made as to whether the new project is allowed to use a public cloud service. If so (Yes), then the project management program 120 assigns the resources of the public cloud 110 instead of the resources from the on-prem 100. At 905, the project management program 120 sets up the info of the public cloud 110 for projects that utilize public cloud resources, wherein the start date/time is calculated with consideration to the preparation time.

Finally, the project management program responses Accept at 906 or Reject at 907 to the project based on the result.

In an example for calculating the project assigned schedule by the project management program 120, the project management program 120 first checks the Project Management Graph 121 and confirms that there is a blank slot during the project request date. Then, the project management program 120 judges whether there is free disk space of disks or not during the blank slots. The project management program 120 also utilizes the "project size" information the project input to determine whether the remaining amount of CPU/memory specs are enough or not. Based on these determinations, the project management program 120 calculates the on-prem usage % for an optimal source and implements the project optimal schedule.

Figure 10:
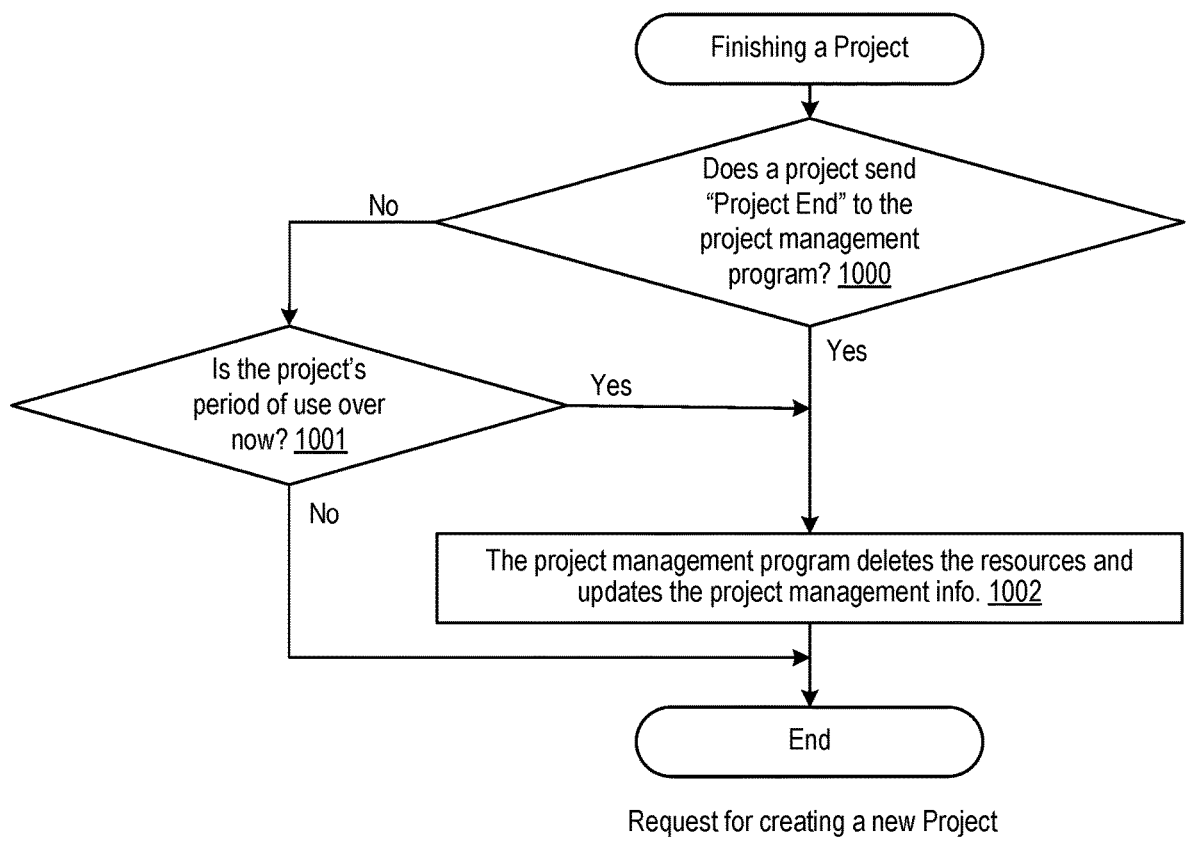
FIG. 10 illustrates an example process for finishing a project, in accordance with an example implementation.

FIG. 10 illustrates an example process for finishing a project, in accordance with an example implementation. When a project is finished, the project sends a "Project End" message to the project management service. A check is performed at 1000 for the project end message. If the service receives this response (Yes), then the process proceeds to 1002 to delete the resources and update the project management info. If the project does not send the "Project End" message (No), the process proceeds to 1001 to determine if the period of use is over for the project. If so (Yes), then the process proceeds to 1002, otherwise (No), then the process ends.

Figure 11:
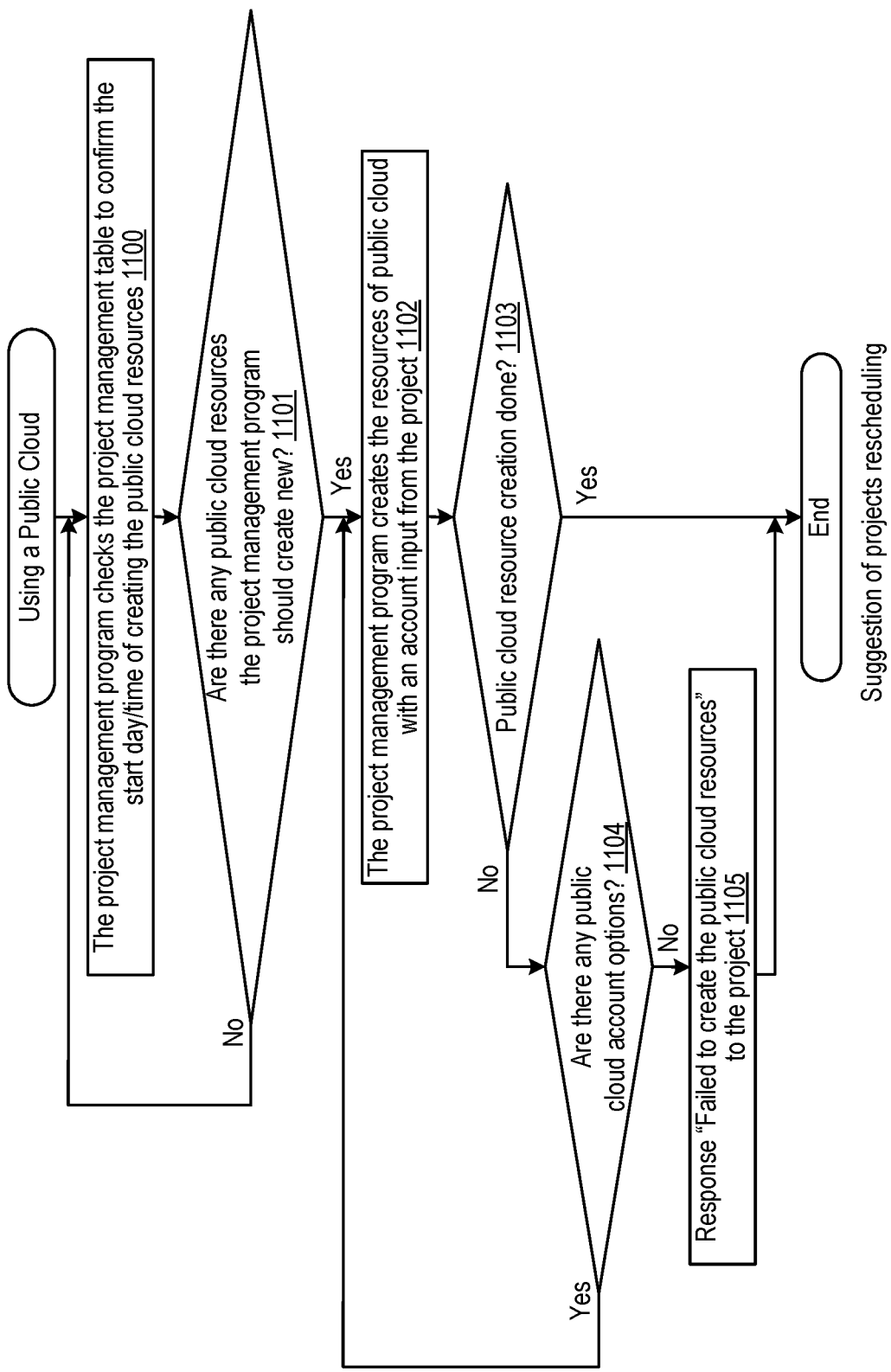
FIG. 11 illustrates an example process of using the public cloud, in accordance with an example implementation.

FIG. 11 illustrates an example process of using the public cloud, in accordance with an example implementation. If the project uses the resource of public cloud, the info has been already set up during the process of request for creating a new project in FIG. 9. At 1100, the project management program 120 checks the project management table to confirm the start day/time of creating the public cloud resources regularly.

At 1101, a determination is made as to whether there are any public cloud resources that should be created by the project management program 120. If so (Yes) the flow proceeds to 1102, otherwise (No) the flow proceeds back to 1100.

At 1102, the project management program creates the resources of public cloud with an account input from the project. At 1103, a check is done to determine if the public cloud resource creation has completed. If so (Yes), the flow ends, otherwise (No) the flow proceeds to 1104. At 1104, a check is made to determine if there are any public cloud options available. That is, the creating the resource of public cloud has failed and the project added other public cloud accounts, so the project management program 120 uses another account to create the resources. If so (Yes), the flow proceeds to 1102, otherwise (No), the flow proceeds to 1105.

At 1105, the project management program 120 responds with "Failed" to the project based on the result if the creation of the public cloud resources has failed.

In a second example implementation, the project management service reschedules the existing projects when the request for creating a new project is received, but there are insufficient system resources.

FIG. 12 illustrates another example flow for providing project rescheduling, in accordance with an example implementation. This process involves rescheduling the existing project(s) when the request for creating a new project is received, but there are insufficient system resources. This process may occur when the new project does not allow the use of the public cloud.

At 1201, the project management program 120 calculates the new project schedule. At 1202, a determination is made as to whether it is possible to assign resources to the new project. If the project management program judges that the resources are not enough to assign the new project, it re-calculates the whole project schedule at 1202. At 1202, a determination is made as to whether it is possible to assign the resources to the new project if other projects are rescheduled. If so (Yes), the flow proceeds to 1203, otherwise (No), the flow proceeds to 1207.

At 1206, the process provides the suggestions for the re-scheduling to other project(s). If the other project(s) accept the rescheduling (Yes), the flow proceeds to 1207 wherein the project management program 120 sets the schedule on the project management table and responds with "Accept" to the projects at 1208. If the other project(s) reject the rescheduling (No), the project management program 120 sends a response of "Reject" to the new project at 1209. The rescheduling function itself can be implemented through any desired implementation, such as functions as provided by the storage system(s) for rescheduling executed projects.

In a third example implementation, the project management service is configured to suggest re-assignment to the existing projects to increase resource utilization efficiency.

Figure 13:
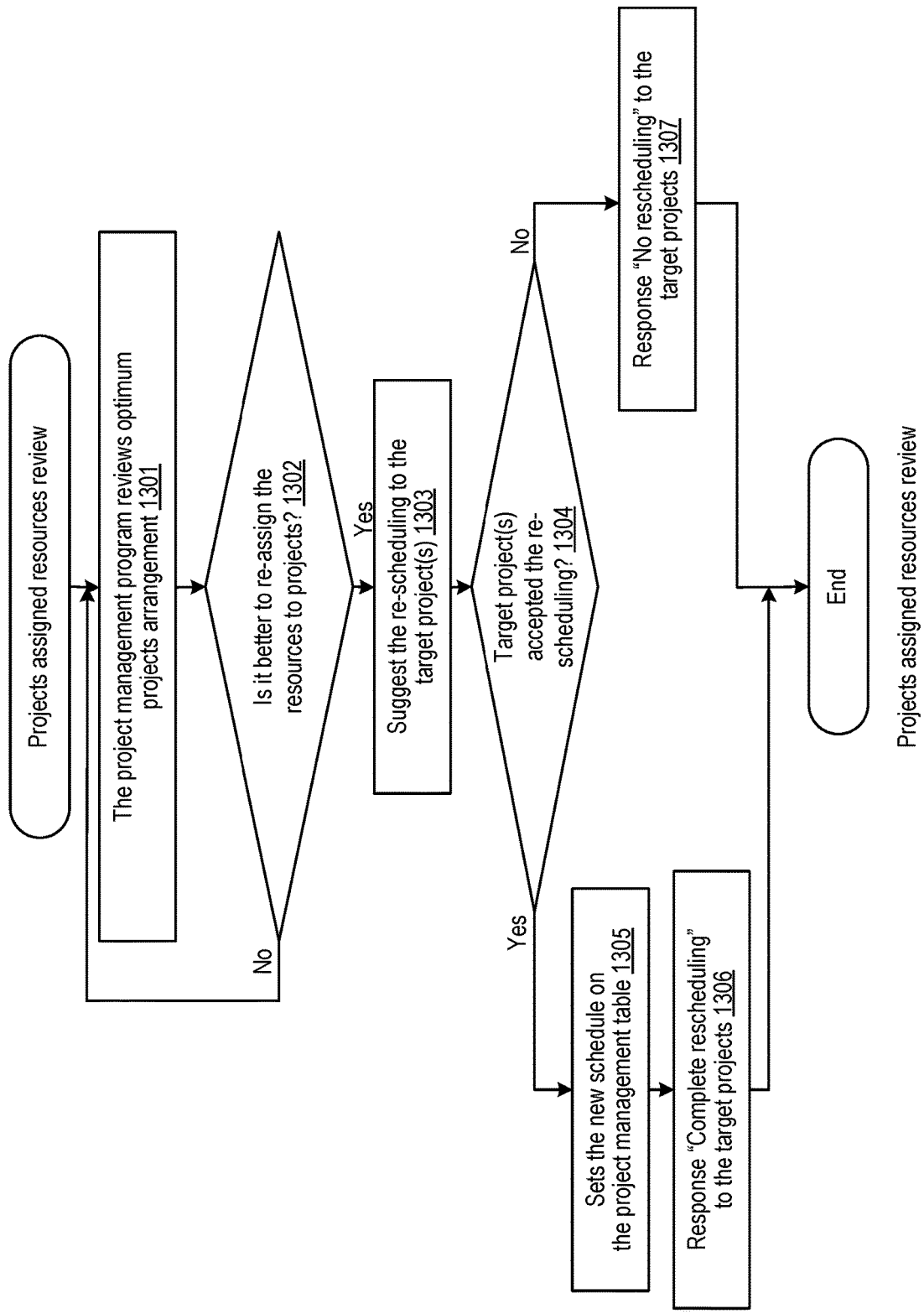
FIG. 13 illustrates an example flow of the project assigned resource review, in accordance with an example implementation.

FIG. 13 illustrates an example flow of the project assigned resource review, in accordance with an example implementation. This flow may occur when the users need to increase resource utilization efficiency.

At 1301, the project management program 120 reviews optimum projects arrangement periodically (e.g., daily, weekly, hourly, according to the desired implementation). At 1302, a determination is made as to whether there is a better resource re-assignment. If so (Yes), then the process goes to 1303 to suggest the re-scheduling to the target project(s).

At 1304, a determination is made as to whether all the target projects accept the rescheduling. If all target projects accept the rescheduling (Yes), the program 120 sets the new schedule on the project management table at 1305 and responds with "Complete rescheduling" to the target projects at 1306. If at least one of target projects does not accept the rescheduling (No), the program responds with "No rescheduling" to the target project(s) at 1307.

Through the example implementations described herein, there is provided a method of a management solution that allows multiple projects in a company to use on-prem resources efficiently and use public cloud resources for insufficient on-prem resources. The example implementations can be implemented on both public cloud and on-prem, however, the example implementations can also be extended to other hybrid systems such as colocation service+public cloud, colocation service+on-prem, and so on in accordance with the desired implementation. Users can confirm that this function is set in the user manual and the dashboard which shows the request form, the outputs of projects rescheduling, results of system monitoring and so on.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for assigning computation resources for execution of projects, the method comprising:
providing an interface configured to receive input to generate a project request for a project;
determining an allocation of computation for executing the project for execution;
determining a schedule for executing the project based on the project request based on the allocation of computation resources;
determining that a first service platform is unavailable to allocate the determined allocation of computation resources to execute the project according to the schedule;
for the first service platform being determined to be unavailable allocate the determined allocation of computation resources to execute the project according to the schedule:
determining that a second service platform is available to allocate the determined allocation of computation resources to execute the project according to the schedule; and
for the second service platform being available to execute the project according to the schedule, allocating the determined allocation of computation resources for executing the project on the second service platform according to the schedule;
wherein the project is executed on the second service platform based on the allocating of the computation resource,
wherein, in the case that the second service platform is unavailable to allocate the determined allocation of computation resources to execute the project according to the schedule, reject the project request, wherein the first service platform is one of an on-premise system or a colocation system, each comprising computation resources including one or more storage systems and one or more servers, and the second service platform is a public cloud system comprising computation resources including one or more computes and one or more virtual disks.

2. The method of claim 1, wherein the determining the schedule for the project based on the project request comprises:
determining a preparation time for allocating the allocation of computation resources;
determining a deletion time for deleting the allocation of computation resources; and
determining a total time required for executing the project based on incorporation of the preparation time and the deletion time.

3. The method of claim 1, further comprising providing a management graph mapping projects executed by the first service platform based on resource usage and execution duration of each of the projects based on a start time and an end time, the execution duration comprising a preparation time and a deletion time.

4. The method of claim 1, further comprising determining whether the first service platform is available to allocate the computation resources to execute the project according to the schedule, the determining comprising:
for a start time of the project request not being available for execution of the project:
determining a rescheduling for one or more projects executing on the first service platform;
providing the rescheduling to the one or more projects;
for an acceptance of the rescheduling by the one or more projects, determining that the first service platform is available; and
for a rejection of the rescheduling by the one or more projects, determining that the first service platform is unavailable.

5. The method of claim 1, wherein the interface is configured to receive input as to whether the second service platform is available for the project.

6. A non-transitory computer readable medium, storing instructions for executing a process for assigning computation resources for execution of projects, the instructions comprising:
providing an interface configured to receive input to generate a project request for a project;
determining an allocation of computation resources for executing the project for execution;
determining a schedule for executing the project based on the project request based on the allocation of computation resources;
for the first service platform being available to allocate the determined allocation of computation resources to execute the project according to the schedule, allocating the computation resources for executing the project on the first service platform according to the schedule;
for the first service platform being unavailable to allocate the determined allocation of computation resources to execute the project according to the schedule:
determining whether a second service platform is available to allocate the determined allocation of computation resources to execute the project according to the schedule,
for the second service platform being available to execute the project according to the schedule, allocating the determined allocation of computation resources for executing the project on the second service platform according to the schedule; and
for the second service platform being unavailable to execute the project according to the schedule, rejecting the project request,
wherein the project is executed on the second service platform based on the allocating of the computation resource,
wherein the first service platform is one of an on-premise system or a colocation system, each comprising computation resources including one or more storage systems and one or more servers, and second service platform is a public cloud system comprising computation resources including one or more computes and one or more virtual disks.

7. The non-transitory computer readable medium of claim 6, wherein the determining the schedule for the project based on the project request comprises:
determining a preparation time for allocating the allocation of computation resources;
determining a deletion time for deleting the allocation of computation resources; and
determining a total time required for executing the project based on incorporation of the preparation time and the deletion time.

8. The non-transitory computer readable medium of claim 6, the instructions further comprising providing a management graph mapping projects executed by the first service platform based on resource usage and execution duration of each of the projects based on a start time and an end time, the execution duration comprising a preparation time and a deletion time.

9. The non-transitory computer readable medium of claim 6, the instructions further comprising determining whether the first service platform is available to allocate the computation resources to execute the project according to the schedule, the determining comprising:
fora start time of the project request not being available for execution of the project:
determining a rescheduling for one or more projects executing on the first service platform;
providing the rescheduling to the one or more projects;
for an acceptance of the rescheduling by the one or more projects, determining that the first service platform is available; and
for a rejection of the rescheduling by the one or more projects, determining that the first service platform is unavailable.

10. The non-transitory computer readable medium of claim 6, wherein the interface is configured to receive input as to whether the second service platform is available for the project.

11. An apparatus for assigning computation resources for execution of projects, comprising:
a processor, configured to:
provide an interface configured to receive input to generate a project request for a project;
determine an allocation of computation resources for executing the project for execution;
determine a schedule for executing the project based on the project request based on the allocation of computation resources;
for the first service platform being available to allocate the determined allocation of computation resources to execute the project according to the schedule, allocate the computation resources for executing the project on the first service platform according to the schedule;

for the first service platform being unavailable to allocate the determined allocation of computation resources to execute the project according to the schedule:

determine whether a second service platform is available to allocate the determined allocation of computation resources to execute the project according to the schedule, for the second service platform being available to execute the project according to the schedule, allocate the determined allocation of computation resources for executing the project on the second service platform according to the schedule; and for the second service platform being unavailable to execute the project according to the schedule, reject the project request, wherein the project is executed on the second service platform based on the allocating of the computation resource, wherein the first service platform is one of an on-premise system or a colocation system, each comprising computation resources including one or more storage systems and one or more servers, and the second service platform is a public cloud system comprising computation resources including, one or more computes and one or more virtual disks.

12. The apparatus of claim 11, wherein the processor is configured to determine the schedule for the project based on the project request by:

determining a preparation time for allocating the allocation of computation resources;

determining a deletion time for deleting the allocation of computation resources; and determining a total time required for executing the project based on incorporation of the preparation time and the deletion time.

13. The apparatus of claim 11, wherein the processor is configured to provide a management graph mapping projects executed by the first service platform based on resource usage and execution duration of each of the projects based on a start time and an end time, the execution duration comprising a preparation time and a deletion time.

14. The apparatus of claim 11, wherein the processor is further configured to determine whether the first service platform is available to allocate the computation resources to execute the project according to the schedule, by:

for a start time of the project request not being available for execution of the project:

determining a rescheduling for one or more projects executing on the first service platform;

providing the rescheduling to the one or more projects;

for an acceptance of the rescheduling by the one or more projects, determining that the first service platform is available; and for a rejection of the rescheduling by the one or more projects, determining that the first service platform is unavailable.

15. The apparatus of claim 11, wherein the interface is configured to receive input as to whether the second service platform is available for the project.

* * * * *